United States Patent Office 3,205,248
Patented Sept. 7, 1965

3,205,248
CHLOROPHENOXYETHYL ESTERS OF DIALLYL-THIONOCARBAMIC ACID
Anton G. Weiss, Nitro, W. Va., and Philip C. Hamm, Webster Groves, Mo., assignors to Monsanto Company, a corporation of Delaware
No Drawing. Original application Oct. 7, 1959, Ser. No. 844,872, now Patent No. 3,142,693, dated July 28, 1964. Divided and this application Sept. 26, 1962, Ser. No. 231,316
2 Claims. (Cl. 260—455)

This is a division of application Serial No. 844,872, filed October 7, 1959, now U.S. Patent No. 3,142,693.

The present invention relates to new compounds and more particularly to aryloxyethyl esters of diallylthiocarbamic acids.

The compounds of the present invention may be represented by the general formula

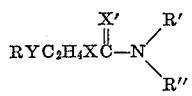

where R represents phenyl or halogen substituted phenyl, Y represents oxygen or sulfur, X and X' represent oxygen or sulfur at least one of which is sulfur and R' and R" represent allyl or chloroallyl. Typical examples of the preferred compounds comprise 2-(phenylthio)ethyl, 2-(phenoxy)ethyl, 2-(p-chlorophenylthio)ethyl, 2-(p-chlorophenoxy)ethyl, 2-(p-bromophenylthio)ethyl, 2-(p-bromophenoxy)ethyl, 2-(2,4-dichlorophenylthio)ethyl, 2 - (2,4-dibromophenylthio)ethyl, 2-(2,4 - dichlorophenoxy)ethyl, 2-(2,4-dibromophenoxy)ethyl, 2-(2,4,5 - trichlorophenylthio)ethyl and 2-(2,4,5-trichlorophenoxy)ethyl esters of diallyldithiocarbamic acid, diallylthiolcarbamic acid and diallylthionocarbamic acid.

Although other methods of preparation are suitable, such thiocarbamates may be conveniently obtained by converting diallylamine to a thiocarbamic acid and condensing the diallylthiocarbamic acid with the halide containing the desired ether substituent. As an illustration of a satisfactory procedure, 23 grams (0.3 mole) of carbon bisulfide was added dropwise with stirring to 68 grams (0.7 mole) of diallylamine dissolved in 150 ml. of dimethyl formamide, the mixture being kept at 20–25° C. during the addition. Then 56 grams (0.3 mole) of p-chlorophenoxyethyl chloride was added in one portion and the mixture stirred for 5 hours at 60–70° C. After cooling to room temperature, 250 ml. of water were added to the product and the water solution extracted with 250 ml. of ether. The organic layer which separated was washed with 300 ml. of water and dried over sodium sulfate. The solvent was removed by stripping at 90–100° C. (14 mm. pressure). The 2-(p-chlorophenoxy)ethyl diallyldithiocarbamate, obtained in theory yield, was an amber oil analyzing 4.6% nitrogen, 10.9% chlorine and 19.8% sulfur as compared to 4.3% nitrogen, 10.8% chlorine and 19.6% sulfur calculated for $C_{15}H_{18}ClNOS_2$.

A solution of 14.7 grams (0.15 mole) of monochloroacetic acid in 50 ml. of water was carefully neutralized with 10.4 grams of potassium carbonate. The solution was cooled to 5° C. and added in one portion to 0.15 mole of a potassium xanthate from an alcohol containing the desired phenoxy ethyl group. The reaction mixture was stirred for one hour at room temperature and to it was then added 19.5 grams of diallylamine. Stirring was continued for 4 hours after which the reaction mixture was extracted with ether, the ether extracts dried over sodium sulfate and the ether removed in vacuo. Products obtained by this procedure after removing volatile constituents by heating to 90–100° C. under 12 mm. Hg pressure are summarized below:

| Product | Yield, percent | Xanthate Reactant |
|---|---|---|
| 2-(Phenylthio)ethyl diallylthionocarbamate. | 87.6 | ⟨phenyl⟩–$SC_2H_4OC(S)$–SK |
| 2-(2,4,5-Trichlorophenoxy)-ethyl diallylthionocarbamate. | 74.6 | 2,4,5-trichlorophenyl–$OC_2H_4OC(S)$–SK |
| 2-(2,4-Dichlorophenoxy)-ethyl diallylthionocarbamate. | 71.7 | 2,4-dichlorophenyl–$OC_2H_4C(S)$–SK |

The new compounds exert significant biological activity. In general they are efficient herbicides which combine grass and broadleaf activity. They are particularly effective in preemergent application. Amounts within the range of 1 to 60 pounds per acre are adequate for most purposes. The toxicants may be applied in the form of a spray containing the active ingredient in a concentration within the range of 0.05–5.0%. While the active components are insoluble in water they are soluble in common organic solvents. They may be dispersed directly in water or dissolved first in an organic solvent and then dispersed. As dispersing and wetting agents there may be employed soft or hard sodium or potassium soaps, alkylated aromatic sodium sulfonates such as sodium dodecylbenzenesulfonate, or an amine salt thereof, alkali metal salts of sulfated fatty alcohols, ethylene oxide condensation products of alkyl phenols, tall oil, higher alcohols or higher mercaptans. The solid formulations or dust may contain in addition to the active ingredient, diluents or extenders, preferably those which render the formulations permanently dry and free flowing. Effective solid diluents are clay, talc, pyrophyllite, silica and fuller's earth.

As illustrative of the herbicidal activity the ester was emulsified in water and the emulsion applied as a spray. In this manner the active ingredient was applied to the soil of seeded plots before any plants emerged. About fourteen days after application of the toxicants results were observed and recorded. The number of seeds emerging was converted to weighted herbicidal ratings based on average percent germination of any particular seed lot times an injury factor. This evens irregularities of ratings on seeds which may vary in percent germination. The injury factor takes into consideration any plants not expected to survive. Thus, phytotoxicity ratings are based on the number of plants which emerge and will survive as observed two weeks after planting. Herbicidal ratings were assigned by means of the following conversion scale:

| Percent emergence: | Phytotoxicity rating |
|---|---|
| 0–25 | 3 or severe. |
| 26–50 | 2 or moderate. |
| 51–75 | 1 or slight. |
| 76–100 | 0 or none. |

Table I illustrates per-emergent herbicidal activity of typical compounds at 5 pounds per acre:

*Table I*

| Active Ingredient | Results Observed |
|---|---|
| 2-(2,4,5-Trichlorophenoxy)-ethyl diallylthionocarbamate. | Severe phytotoxicity to morning glory, raddish, sugar beet, crab grass, pigweed, wild buckwheat, tomato and soybean; moderate phytotoxicity to rye grass and sorghum. |
| 2-(2,4-Dichlorophenoxy)ethyl diallylthionocarbamate. | Severe phytotoxicity to morning glory, radish, sugar beet, crab grass, pigweed, wild buckwheat, tomato, sorghum and soybean; moderate phytotoxicity to brome-cheat grass. |
| 2-(2,4-Dichlorophenoxy)ethyl bis(2-chloroallyl)dithiocarbamate. | Moderate phytotoxicity to morning glory, raddish, wild buckwheat and tomato. |

It is intended to cover all changes and modifications of the examples of the invention herein chosen for purposes of disclosure which do not constitute departures from the spirit and scope of the invention.

What is claimed is:
1. 2 - (2,4 - dichlorophenoxy)ethyl diallylthionocarbamate.
2. 2-(3,4,5 - trichlorophenoxy)ethyl diallylthionocarbamate.

References Cited by the Examiner

UNITED STATES PATENTS

| 2,941,879 | 6/60 | Goodhue | 71—2.7 |
| 2,992,091 | 7/61 | Harman et al. | 71—2.6 |
| 3,055,751 | 9/62 | Tilles et al. | 71—2.3 X |

FOREIGN PATENTS 219,675   2/58   Australia.

OTHER REFERENCES

Nature, vol. 176, pages 308 to 310, Aug. 13, 1955.

CHARLES B. PARKER, *Primary Examiner*.
JULIAN S. LEVITT, *Examiner*.